United States Patent [19]
Hubbard et al.

[11] 3,833,996
[45] Sept. 10, 1974

[54] METHOD AND A MACHINE FOR ALIGNING AND JOINING PIPES

[76] Inventors: Don P. Hubbard, 410 Vista Arroys Dr., Encinitas, Calif. 92024;
Richard N. Levake, 960 Nobley, Cardiff-By-The-Sea, Calif. 92007;
James A. Steiger, 1911 Raymond Ln., Oceanside, Calif. 92054

[22] Filed: July 14, 1972

[21] Appl. No.: 271,802

[52] U.S. Cl. .................................. 29/237, 29/282
[51] Int. Cl. ............................................. B23p 19/04
[58] Field of Search ............ 29/237, 238, 525, 263, 29/282; 285/18, 24, 26; 61/72.3; 294/93

[56] References Cited
UNITED STATES PATENTS

| | | | |
|---|---|---|---|
| 3,061,916 | 11/1962 | Kretz | 29/238 |
| 3,469,298 | 9/1969 | Pizzagilli | 29/237 |
| 3,599,315 | 8/1971 | Pizzagilli | 29/237 |
| 3,639,967 | 2/1972 | Brighton | 29/237 |

*Primary Examiner*—James L. Jones, Jr.
*Attorney, Agent, or Firm*—Brown & Martin

[57] ABSTRACT

The invention is directed principally to a process of joining pipes of large diameter, for example, pipes used in conveying water from dams to reservoirs, and to a machine for carrying out the process. Such pipes each have a bell at one end and the other end is of smaller diameter than the bell end and referred to in the trade as the "spigot end." The spigot end is provided with a shoulder. The machine can be disposed within the pipe that is laid and it includes mechanism that is extendible into the spigot end of the pipe to be laid, the mechanism including rollers that are brought into abutting relationship with the shoulder at the spigot end of the pipe to be laid. The machine, through the shoulders, draws the spigot end of the pipe to be laid into sealing relationship with the bell of the pipe that was laid.

10 Claims, 11 Drawing Figures

METHOD AND A MACHINE FOR ALIGNING AND JOINING PIPES

BACKGROUND OF THE INVENTION

1. Field of the Invention:

The invention is directed to a process of and machine for joining pipes.

2. Description of the Prior Art:

The mechanism used prior to the present invention comprised a crane that held the spigot end of a pipe at a slight angle with respect to the bell end of a horizontally laid pipe. The upper portion of the spigot end was pushed into the upper part of the bell of the laid pipe. Then various methods were used for pushing the spigot into the adjacent bell as the crane slowly moved the pipe having the spigot from the angled position to a position in which the pipes were axially aligned.

The pipes, in addition to being joined, must be sealed at the joints; and to accomplish this, a gasket encircles the pipe adjacent the spigot end thereof. By the heretofore used method of sealing, in which the crane slowly moved the angularly disposed pipe toward axial alignment with the laid pipe, the inserted portion of the gasket was progressively stretched and, consequently, progressively thinned in a cross section and the portions of the gasket being inserted with the spigot end were progressively compacted and progressively increased in cross section. The attempt to partly circumvent the problem of thinning and compacting was only successful at times and then only after constant manipulation of the gasket and the raising and lowering of the spigot end of the pipe to be joined. In many cases, the attempts were futile and it was necessary to resort to other methods, such as welding.

In practicing the present invention, the pipes are disposed in substantially axial alignment and then one pipe is moved toward the other so that the compression on the gasket in the form of an O-ring is constant through the ring of rubber.

SUMMARY OF THE INVENTION

In practicing the present invention, the pipe to be laid includes a shoulder by which the spigot end of the pipe to be laid is moved into the bell of the laid pipe. The pipe to be laid is provided also with another shoulder for retaining a gasket, in the form of an O-ring, in position on the periphery of the spigot near the end thereof. A machine is disposed in the laid pipe adjacent the bell end thereof. The machine includes mechanism that is extendible into the spigot end of the laid pipe, which mechanism includes rollers which can roll along the runway of the circular groove while abutting the circular shoulder of the ring. The extendible mechanism also includes ramp means that extend longitudinally of the pipe having the spigot end that is to be inserted into the bell of the other pipe. The machine also includes mechanism for moving the extendible mechanism into the bell of the laid pipe.

Other features and the advantages of the present invention will be apparent from the following description, reference being made to the accompanying drawings wherein preferred embodiments of the invention are illustrated.

DESCRIPTION OF THE PREFERRED EMBODIMENT

The pipes are standard and two pipes are herein shown at 20 and 22. Pipe 20 has a bell 24 at one end and a spigot 26 at the opposite end. Pipe 22 is provided with a bell 28 (see FIG. 11) and a spigot 30. The pipes to be coupled have, for example, a diameter of eleven feet. The outer end of the spigot 30 is provided with a circular ring 32, commonly referred to as a "Carnegy" ring. The ring 32 is provided with an external groove 34 for receiving a resilient gasket 36, herein shown as an O-ring. The gasket is under tension. The ring is provided with an inner shoulder 38, herein shown as a wall of a circular groove 40.

The pipe 22 that is to be coupled with pipe 20 is pulled into the bell 24 of pipe 20 by shoulders 42 on a machine 44, which shoulders 42, herein shown as rollers, are engagable with the inner shoulders 38 on the ring 32.

The spigot end of pipe 22 that is to be coupled with pipe 20 is pulled into the bell 24 of pipe 20. The machine 44 is provided with a spider 46 having a plurality of radially extending hollow legs 48 that are interconnected with one another by braces 50. These legs 48 each guide a radially extending arm 52 that is pivotally connected with a shoe 54 by a pin 55. The peripheral surface 56 of the shoe is shaped to substantially complement the inner circular shape of the spigot of the pipe 22, whereby the rollers 42 are disposed for the same purpose. The legs 48 of the spider carry the stationary parts 58 of fluid motors 60 and the movable parts 62 of the motors are pivotally connected with the shoes 54 by pins 63. Preferably, the fluid motors 60 are of the hydraulic type, the stationary parts of the motors are cylinders that are fixed to the hollow legs of the spider 46 and the movable parts are rams.

Figure 1:
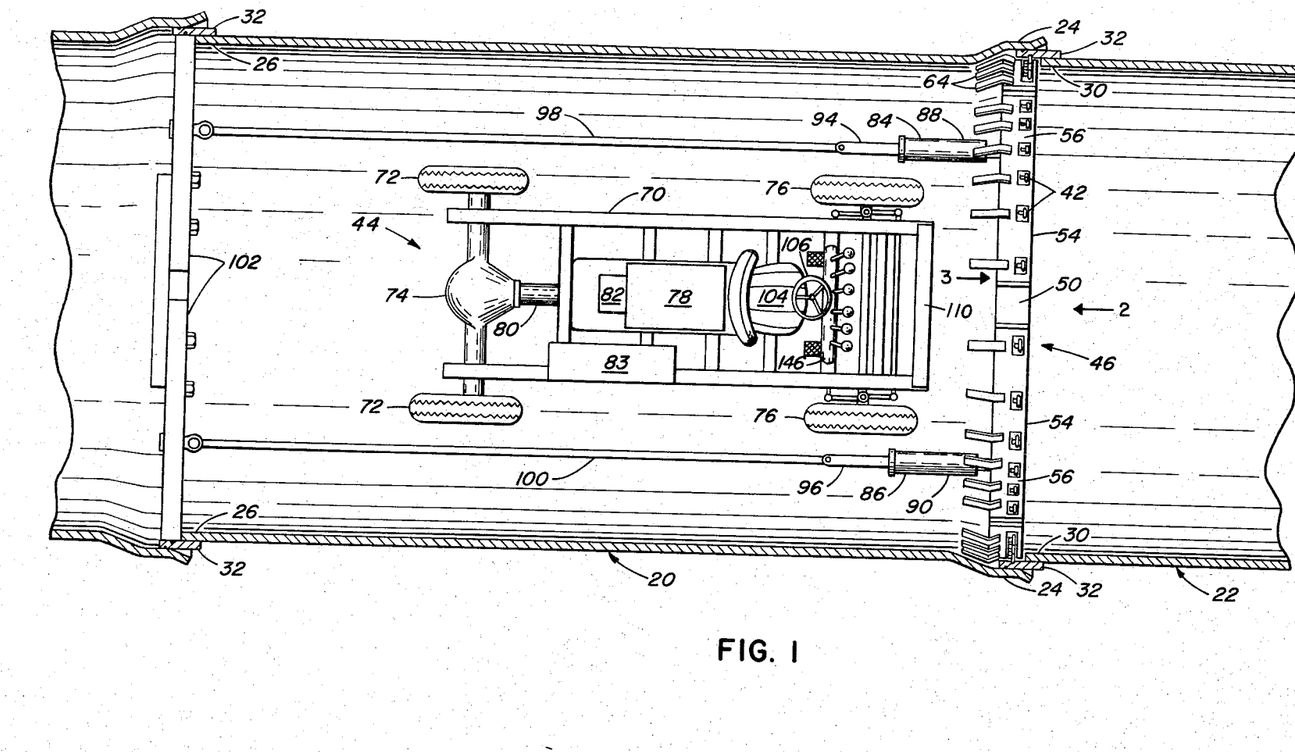
FIG. 1 is a sectional view of a laid pipe and of the spigot end of a pipe that is to be laid, the view also showing a top plan view of the mechanism for moving the pipe to be laid into the laid pipe, parts of the mechanism having been deleted in FIG. 1 for the sake of showing essential parts, the deleted parts being shown in FIG. 11.
Figure 2:
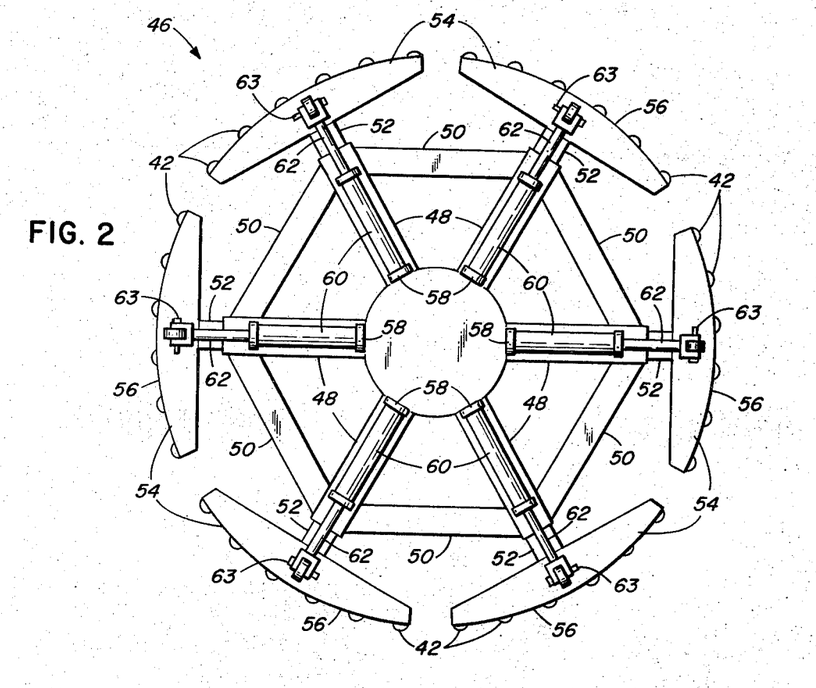
FIG. 2 is a view of the spigot-aligning mechanism shown in FIG. 1, looking in the direction of arrow 2 of FIG. 1, but on a larger scale.
Figure 3:
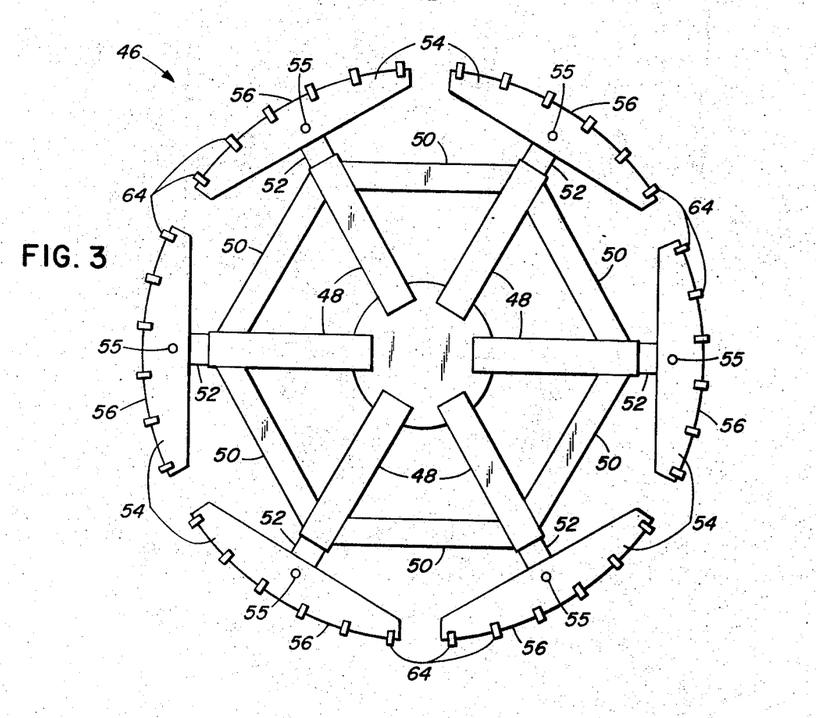
FIG. 3 is a view of the spigot-aligning mechanism shown in FIG. 1, but showing the same looking in the direction of arrow 3 of FIG. 1.

Each of the shoes carries any desirable means for forming the inner surface of that bell which is to receive a spigot to conform to the outer surface of the spigot. One means is of the type in which each of the shoes 54 carries ramp means in the form of a plurality of ramps 64 that extend to the left, as viewed in FIG. 1, and radially inwardly. In operating the machine, the spider is extended into the spigot of pipe 22, i.e., the spider is moved to the right, as viewed in FIG. 1, so that the rollers 42 are radially aligned with the groove 40 in the ring 32. Then the fluid motors 60 are separately actuated to extend the curved outer surfaces of the ramps outwardly so that they lie in the same horizontally extending plane as the periphery of ring 32. When so extended, the rollers 42 will be in the groove 40. Then the machine is actuated to pull the spider to the left, and in so doing, the ramps 64 will form the inner surface of the bell 24 to complement the periphery of the rings 32 on the spigot of pipe 22.

Figures 4, 5:
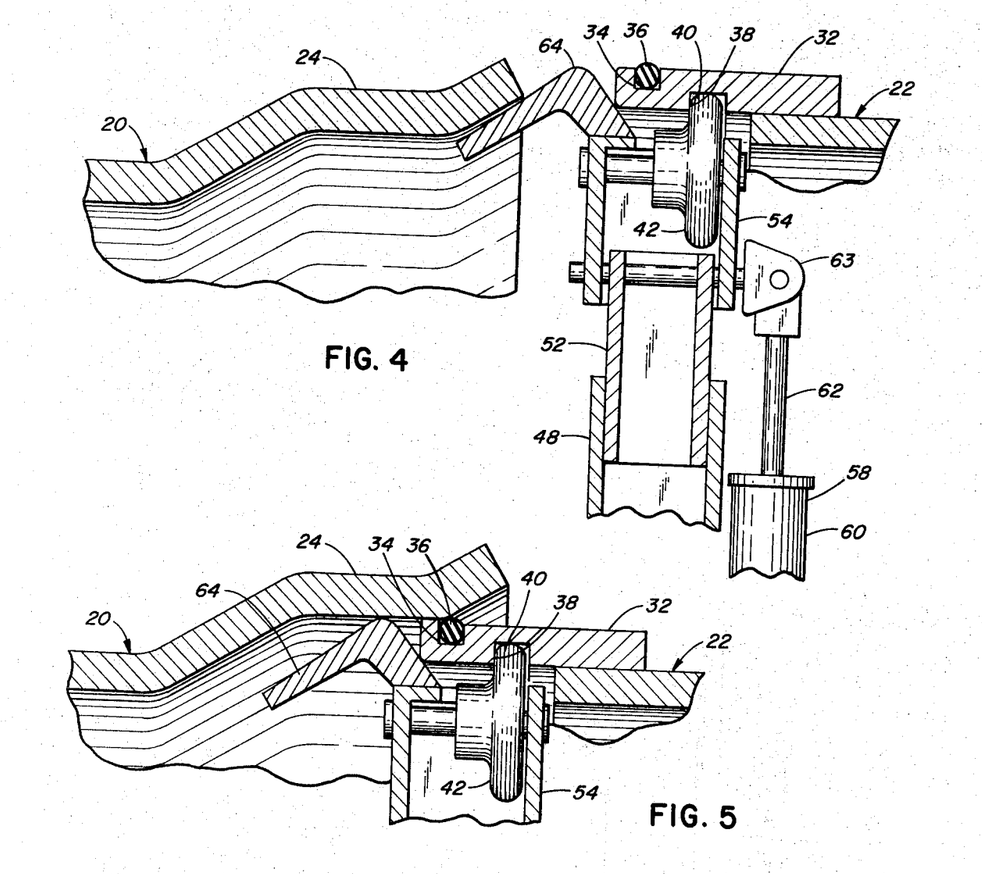
FIG. 4 is a fragmentary sectional view showing a fragment of the bell of a pipe that was previously laid, the view also showing a fragment of the spigot of a pipe which is to be laid, the view also showing the mechanism for moving the pipe to be laid into the laid pipe. The position of the mechanism is such that it shows the ramp means about to function.
FIG. 5 is a view similar to FIG. 4, but showing the position of the mechanism as it pulls the pipe to be laid into the laid pipe.
Figure 6:
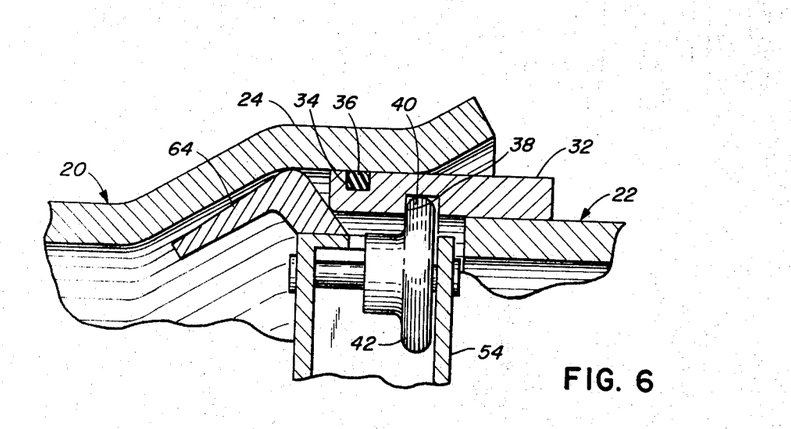
FIG. 6 is a view similar to FIG. 5, but showing the position of the mechanism at the time the spigot of the pipe to be laid is in coupled position with the bell of the laid pipe.
Figure 7:
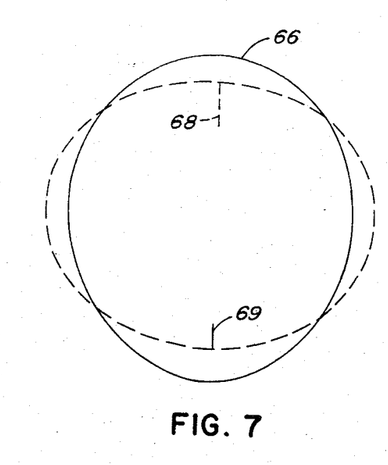
FIG. 7 is an exaggerated schematic view showing in full lines a non-circular outer end of a bell that is to receive the spigot of a pipe to be coupled, and showing in dot and dash lines the non-circular outer end of a spigot that is to be coupled with the bell of the laid pipe, the view depicting those ends prior to the entry of the ramps into the spigot.
Figure 8:
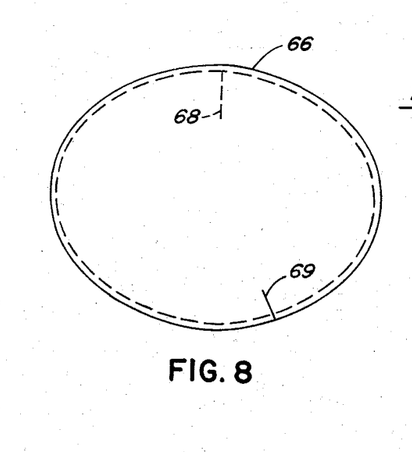
FIG. 8 is a schematic view similar to FIG. 7, but showing the two pipes in their final sealed position.
Figure 9:
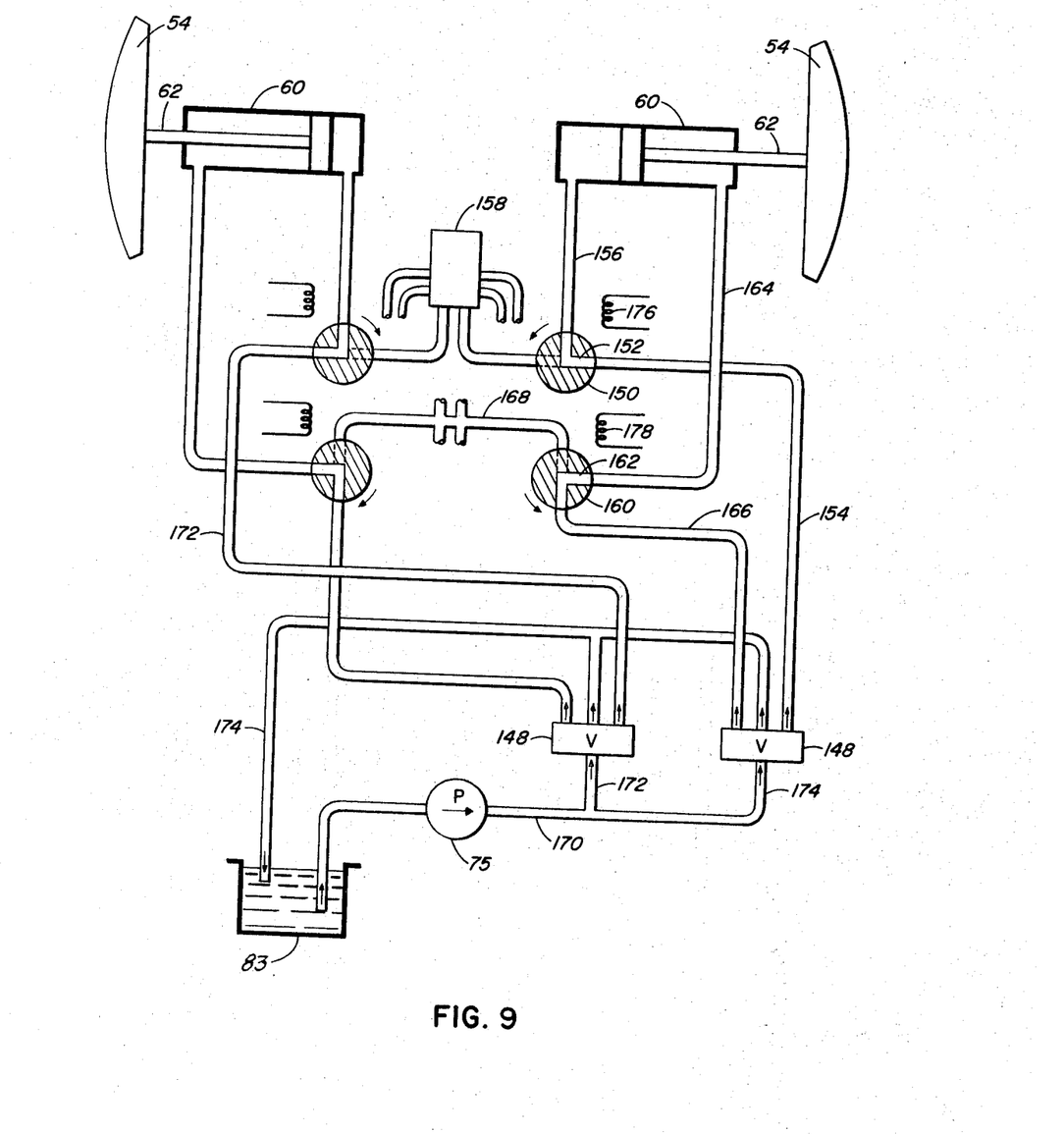
FIG. 9 is a diagrammatic view of the fluid system when the cylinders of the motors are connected in parallel.

Referring now to the schematic views shown in FIGS. 7, 8 and 9, the full line 66 shows the outer end of the bell 24 of pipe 20. Usually, the end is out-of-round and the shape depicted is exaggerated in FIG. 7. The dot and dash line 68 depicts the outer end of the spigot 30 of pipe 22. Like the bell ends, the spigot ends are usually out-of-round, which out-of roundness is also exaggerated in FIG. 7. When the spider 46 is moved by the mechanism to a position in which the rollers 42 are aligned with the groove 40, the ramps 64 are in near engagement with the inner surface of the spigot 30 of pipe 22 as shown in FIG. 4. Then, upon farther pulling of the machine, the ramps 64 will engage the inner surface of the bell 24 of pipe 20 and start the mating of the bell and the spigot to complement the end of the spigot and the outer portion of the bell. The operator then actuates some of the fluid motors 60 independently of one another for the purpose of shifting the rollers 42 so that the peripheries thereof engage the base of grooves 40. At that time, the pressures, of necessity, vary in the cylinders of the fluid motors. The machine 44 is then actuated to cause the spider 46 and the fluid motors to be pulled to the left. Preferably, prior to or during this movement, suitable valve mechanisms are actuated to interconnect all of the cylinders of the motors with one another whereby the rams can "float." This pulling movement is continued until the spigot is in its home position, the O-ring extending far enough into the bell 24 to assure adequate sealing between the bell 24 and the spigot 30 as shown in FIG. 6.

It is highly important to observe that by this process, no attempt is made to cause the spigot 30 to assume the shape of inner surface of the bell 24, nor is an attempt made to cause the bell 24 to assume the shape of the outer surface of the spigot 30, but instead the process provides for merely causing the bell and spigot to complement one another, i.e., both the bell and spigot may move to complementary positions. As shown in FIG. 8, the bell and spigot, although out-of-round, complement one another.

During the pulling of the spider 46 to the left, due to difference in contours of the inner surface of the bell of pipe 20 and outer surfaces of the spigot 30 of pipe 22, relative peripheral movement is imparted between the spigot and the bell. It has been found that such relative movement created highly undesirable friction that had to be overcome. Therefore, all pulling imparted by the spider to the spigot is through the rollers 42. Referring to FIGS. 7 and 8, for illustrative purpose, a data line 69 is used to show the extent of relative peripheral movement that is imparted between the spigot 30 and the bell 24 as the spigot is pulled into the bell. Because the axes of the rollers are set at right angles or substantially at right angles to the direction of the pulling imparted thereto, the rollers can roll with the relative peripheral movement between the pipes. Thus, the friction between the relative peripheral movement of the pipes is reduced to a minimum.

While several ways can be devised for pulling the spider 46 and the shoes 54 to the left, one such way includes pulling the entire machine 44 to the left. As herein shown, the machine is supported on a chassis 70 having rear wheels 72 that are rotated through a differential that is included in housing 74 and front wheels 76 that can be turned in the usual manner for guiding the chassis. The spider 46 is fixed to the chassis by mechanism hereinafter described. The chassis carries a rotatable power source, preferably an electric motor 78, and the motor rotates a fluid pump 82, preferably of the hydraulic type. The pump is connected with a reservoir 83. A hydraulic motor 82 turns a shaft 80 leading to and connected with the differential in the housing 4. Suitable valves (not shown) control the motor 82. Two hydraulic motors 84 and 86 are disposed on opposite sides of the chassis, the right ends of cylinders 88 and 90 of the motors being pivotally connected to the spider 46 by pins 92. Rams 94 and 96 of the motors 84 and 86 are connected to rods 98 and 100, respectively, and these rods are pivotally connected to a spreader bar 102, the ends of which abut the end of spigot 26 of pipe 20. By manipulating valves leading from the hydraulic pump 82, hydraulic fluid can be forced, respectively, into the left ends of cylinders 88 and 90 of hydraulic motors 84 and 86 to force the hydraulic fluid from the right ends of the cylinders thereby causing the cylinders to move to the left. This left movement pulls the chassis, the spider 46, the motors 60 and the shoes 54 to the left, thus pulling the spigot 30 of pipe 22 into the bell 24 of the pipe 20.

The spider 46, the motors 60 carried thereby and the shoes 54 can be moved to the right to extend those elements into the spigot 30 of pipe 22, either by moving the chassis 70 through hydraulic motors 84 and 86 or, preferably, by the chassis motor 78.

Figure 10:
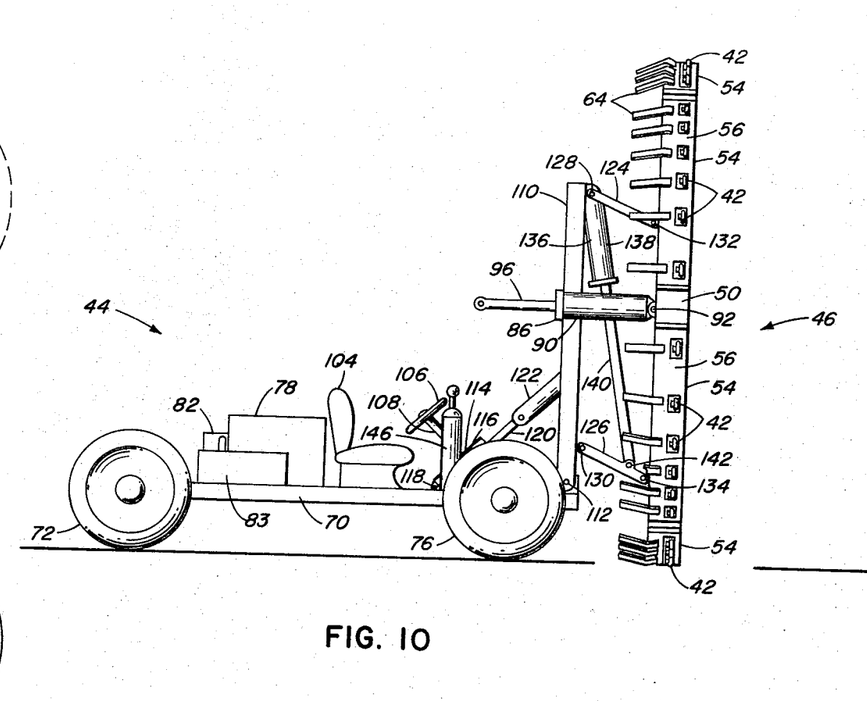
FIG. 10 is a side view of the machine.

Referring now to FIG. 10, the chassis 70 carries an operator's seat 104 disposed behind the steering wheel 106 and steering column 108, used for turning the front wheels 76 of the chassis. The chassis carries an upright 110 that is pivotally supported at the front end of the chassis 70 by pin 112. A cylinder 114 of a fluid motor 116 is pivotally supported by a pin 118 on the chassis 70 and the ram 120 of the motor 116 is attached to a rod 122, the rod being attached to the upright 110 intermediate the top and bottom of the upright. By manipulating a valve, the upright 110 can be tilted to the left or right. Two superimposed links 124 and 126 are provided, the left ends of which are pivotally attached, respectively, with the upright 110 by pins 128 and 130 and the right ends of those links are pivotally connected, respectively, with the spider 46 by pins 132 and 134. A cylinder 136 of a fluid motor 138 is pivotally connected by pin 128 to upright 110, and a ram 140 of the motor 138 is connected by a pin 142 to the lower link 126, intermediate the ends thereof.

By manipulating a valve for controlling the fluid motor 138, the spider can be raised and lowered.

An upright 146 is fixed to the chassis 70 in front of the operator's seat. All valves heretofore mentioned are carried by the upright 146 and within reach of the operator on the seat.

When a pipe, such as pipe 22, is to be laid, a mark is placed on the ground showing the direction in which the pipe is to be laid. Usually, a crane is used to pick up the pipe to be laid and it is lowered by the crane into position. The approximate center of the bell 28 should be aligned with the mark. At that time, the end of the spigot 30 of pipe 22 usually is not in alignment with the bell 24 of pipe 20. Therefore, the spider 46 must be moved and such movement is attained by manipulating the valve for fluid motor 116 or fluid motor 138 or both of these motors.

Referring now to FIG. 9, the diagrammatic view of the hydraulic system, only two of the hydraulic motors 60 are shown, merely for illustrating how all six motors are controlled. The pump 75 withdraws fluid from the reservoir 83.

Six four-way valves 148 are employed, one for each of the hydraulic motors 60. The valves 148 are of the type shown in FIGS. 159 and 160 in the book entitled *Hydraulics as Applied to Machines*, copyrighted in 1941 by Henry Ford Trade School of Dearborn, Michigan. Six valves 150 are provided, each having a passage 152. When in one position, the passages 152 of valves 150 are connected, respectively, with ports in valves 148 and ports in valves 150, by pipes 154. When in those positions, passages 152 are connected, respectively, to the high pressure sides of the cylinders of motors 60 by a pipe 156. When in another position, valve passages 152 will still be connected with the high pressure sides of those cylinders by pipes 156.

Six valves 160 are provided, each having a passage 162. When in positions for permitting the flow of fluid from the low pressure side of the cylinders, passages 162 are connected with those low pressure sides by pipe 164 and with valve 148 by pipe 166. When the passages 162 are in their other positions, they remain connected with the low pressure side of the cylinder by pipe 164, and are connected with a pipe 168.

Valves 148 are actuated selectively and independently so that the six shoes 54 can be forced inwardly or outwardly selectively and independently so that the peripheries of the rollers 42 engage the base of the groove 40. To actuate a hydraulic motor 60, a valve 148 is moved from a position in which the flow of fluid from the pump 75 is directly through valve 148 to the reservoir 83 via pipes 170, 172 and 174 to a position in which the fluid flows from the valve 148 to the high pressure side of a cylinder of a motor 60 via pipe 154, passage 152 of valve 150 and pipe 156. The fluid returns from that cylinder through pipe 164, passage 162 of valve 160, pipe 166, valve 148 and pipe 174 to the reservoir.

After the shoes 54 are actuated selectively to cause the rollers to engage the base of groove 40, all valves 148 are shifted to positions in which they cease the flow of fluid through valves 150 and 160, the flow being direct from the valves 148 to the reservoir.

Simultaneously, or substantially simultaneously, twelve actuators in the form of solenoids are energized, only four of the coils therefor being shown, two of which coils 176 and 178 control, respectively, valves 150 and 160 for controlling the hydraulic system on the right in FIG. 9. It is understood that the like valves are actuated for the system shown on the left of FIG. 9 and on the other four systems for the other four hydraulic motors.

The twelve actuators are energized prior to or simultaneous to the pulling of the spigot into the bell. The actuation of the coils 176 to their dotted-line positions causes all of the high pressure sides of the cylinders of motors 60 to interconnect with the accumulator 158. The accumulator is of the type that has an upper air chamber and a lower liquid chamber that are separated by a plunger that is normally urged downwardly. The actuation of the coils 178 interconnected all of the low pressure sides of the cylinders of motors 60 to be interconnected through their pipes 168.

Since the cylinders are no longer connected with the pump or the reservoir, the cylinders may be said to float. The cylinders being interconnected on the high sides thereof, the pressure on spigot high sides of the cylinders is equal, and with the interconnection on the low sides thereof, the pressure on the low sides of the cylinders is equal. It will be understood that to provide complementarity of the spigot to the bell relatively higher pressures had to be applied in some cylinders relative to others. Such higher pressures on the spigot caused relatively high strains on parts of the spigot. By equalizing the pressures on the high side and equalizing pressures on the low side of the cylinders, the higher strains on the spigot are lessened and the stresses on the bell are increased to thereby substantially divide the stresses between the spigot end and the bell. Such actions result in a compromise of strain, i.e., the bell partly conforms to the contour of the spigot and the spigot partly conforms to the contour of the bell. This relieves the undesirable attempt to cause the spigot to conform in contour to the original contour of the bell.

Figure 11:
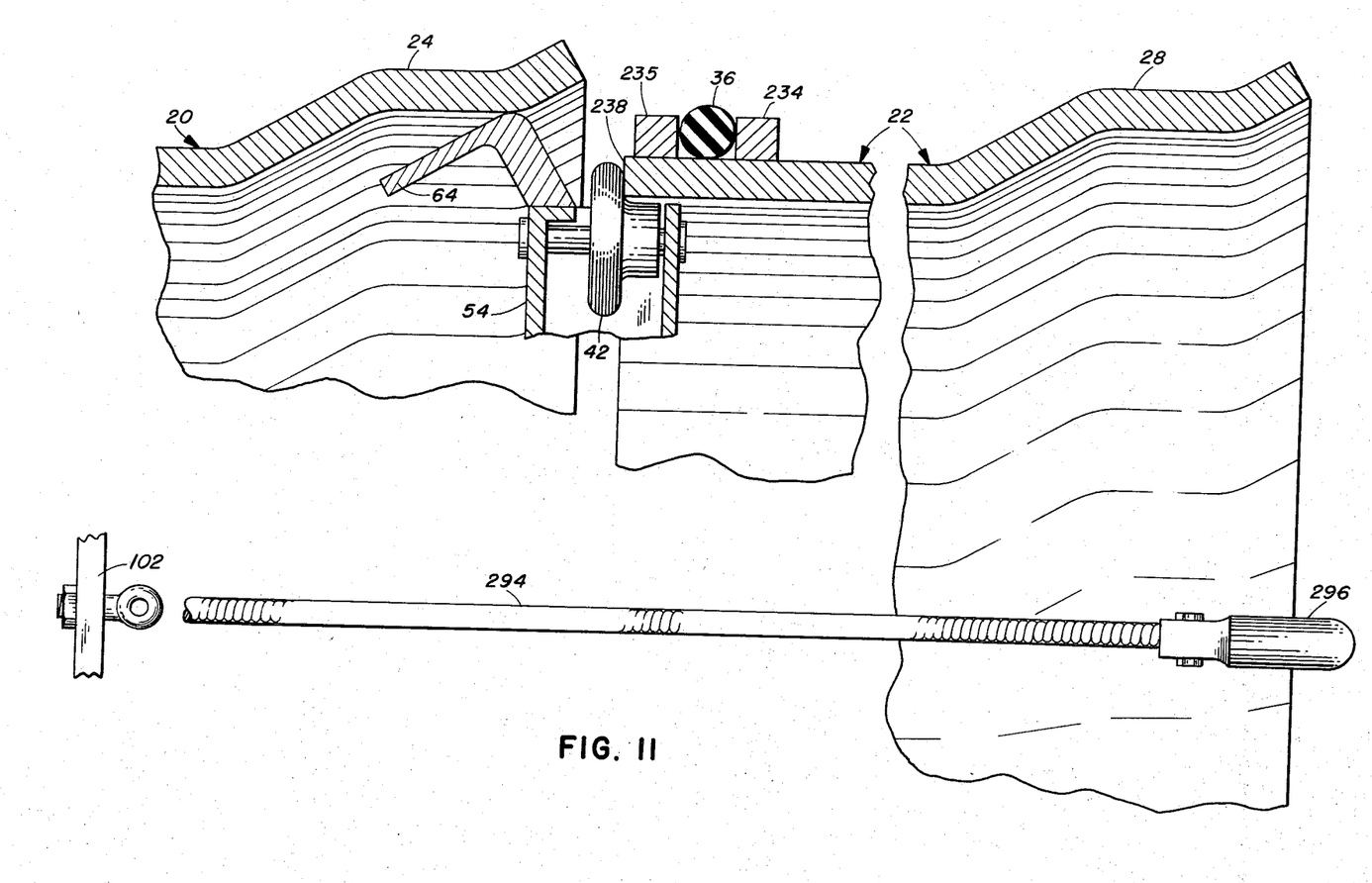
FIG. 11 is a fragmentary view of a different embodiment of the invention.

Referring now to the embodiment shown in FIG. 11, two rings 234 and 235 are employed instead of the Carnegy ring 32. The rings are welded to the exterior of the pipe 22 and adjacent the end of the spigot and form an annular groove. The gasket in the form of an O-ring 36 is disposed between the rings 234 and 235. The end of the spigot forms a shoulder 238 and engages the left side of rollers 42 when the pipe 22 is pulled into the bell 24 of the pipe 20.

In this embodiment, the spigot of pipe 22 is pulled into the bell 24 of pipe 20 by a plurality of cables 294, only one of which is shown. One end of each of the cables is connected to the spreader bar 102 at the end of pipe 20 and the other end of each of the cables carries hooks 296 that are hooked about the bell 28 of pipe 22.

By the present invention, the pipes are interconnected by pulling one pipe into the other longitudinally.

This is made possible by the employment of the ramp means and the rollers. Since usually the bell of one pipe is out-of-round, and the spigot of the pipe that is to be received in the bell is out-of-round, and since that bell and that spigot are to be mated, peripheral movement is necessary between the bell and spigot when the spigot is pulled into the bell. The peripheral movement can be effected with a minimum resistance since the rollers roll with that peripheral movement.

Too, in view of the fact that the spigot is pulled into the bell, the shore of the gasket can be 100 percent and have such thickness so as to completely fill the groove containing the same when compressed. Since rubber or the like gaskets take a set position after being held in flexed position, relative movement of the pipes after setting causes a leakage at the joint between the gasket and the pipes, because, once set, the rubber does not change from its set position. By applying a gasket that completely fills the groove for the gasket, movement of one pipe relative to another after the setting remains constant.

By virtue of the present invention, the time for laying of pipes, such as those that are eleven feet in diameter, has been decreased several hundred percent.

Having described our invention, we claim:

1. In a system for joining a large pipe having a spigot end with a large pipe having a bell end, by a machine that pulls the pipes together with the sigot end in the bell end, the machine comprising,
   an actuating mechanism for fitting into the pipes,
   said mechanism including a spider having a plurality of radially extending arms for supporting the spigot end of the pipe,
   a plurality of roller means on the ends of said arms for rollably contacting and supporting the spigot end of the pipe,
   motor means for selectively moving each of said arms radially outward forcing each of said roller means against the pipe,
   connector means for pulling the spigot end of the pipe into the bell end of the pipe, whereby in joining the pipe ends one of the pipe ends can rotate axially relative to the other pipe end,
   said roller means comprising individual shoes secured to the ends of said arms and having rollers mounted on said shoes substantially aligned with the circumferential surface of the pipe,
   and said shoes including a plurality of ramps extending longitudinally o the pipes for guiding the spigot end of the pipe into the bell end of the pipe.

2. A system as claimed in claim 1 wherein,
   said mechanism including a wheeled vehicle having a spider frame mounted on one end thereof,
   said arms being positioned on said spider frame,
   said wheeled vehicle normally being positioned in the bell end pipe,
   wherein said vehicle rollably moves in said bell end pipe in aligning the spigot end of the pipe with the bell end of the pipe.

3. In a system as claimed in claim 2 wherein,
   said motor means having power means sufficient to force said arms and roller means radially outward against the inner surface of the spigot end of the pipe to change the circular configuration of the pipe end.

4. A system as claimed in claim 3 wherein,
   said power means and motor means having means for equalizing the outward force of said roller means against the pipe among each of said roller means.

5. A system as claimed in claim 2 wherein,
   said connector means comprises a longitudinal connector with ends contacting and being secured to each of the pipes,
   and means for drawing said opposite ends together pulling said pipes together.

6. A system as claimed in claim 2 wherein,
   said connector means comprising motor means on said vehicle for moving said vehicle in the pipe and for pulling the spigot end of the pipe into the bell end of the pipe.

7. A system as claimed in claim 2 in which the spigot end of the pipe has an internal circumferential groove forming a shoulder adjacent the end of the pipe, wherein,
   said rollers of said roller means extend into the internal groove in the pipe, whereby said rollers are retained in a given rolling channel during the joining of the pipes.

8. A system as defined in claim 7 wherein,
   the connector means includes a connector with one end connected to the opposite end of the pipe having the bell end, and with the other end of the connector means connected to said spider.

9. A system as claimed in claim 8 wherein,
   said rollers having a tire shape with the side of the tire abutting against the shoulder in the groove.

10. A system as claimed in claim 2 wherein,
    support means on said vehicle for supporting said spider in a plane normal to the longitudinal axis of the pipes,
    and control means for adjusting the plane of said spider to conform to the plane of the spigot end of the pipe.

* * * * *